Nov. 19, 1935.  A. E. OSTRANDER  2,021,804
BRAKE RIGGING SUPPORT
Filed Jan. 28, 1932
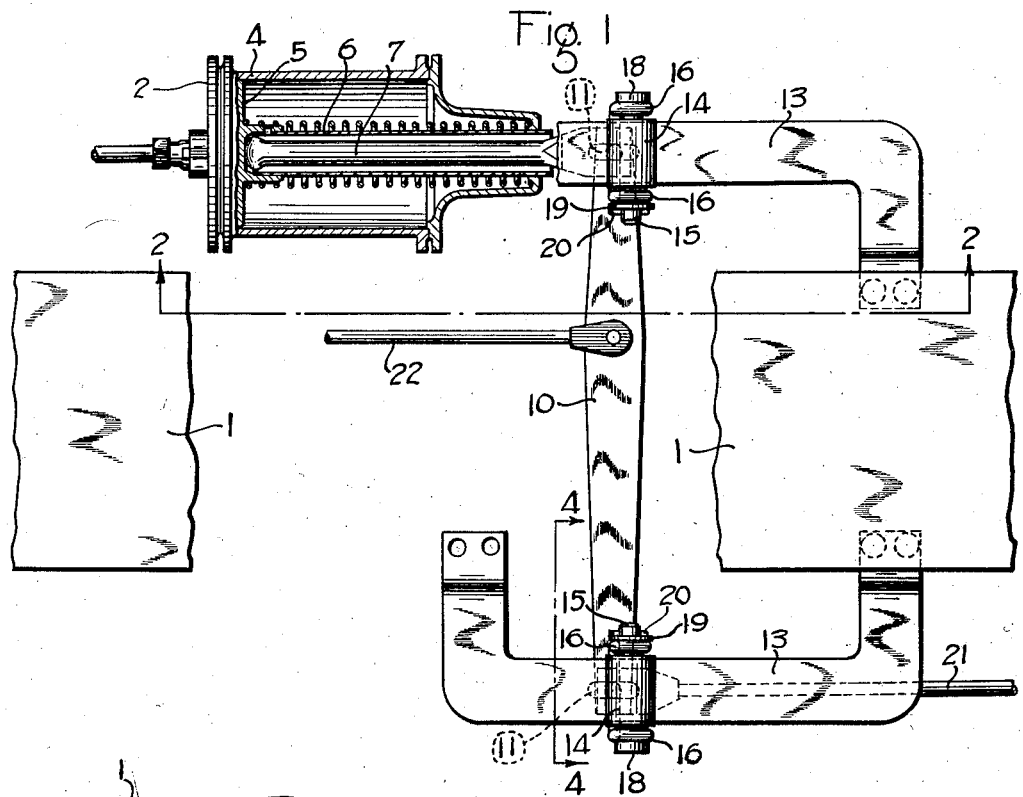
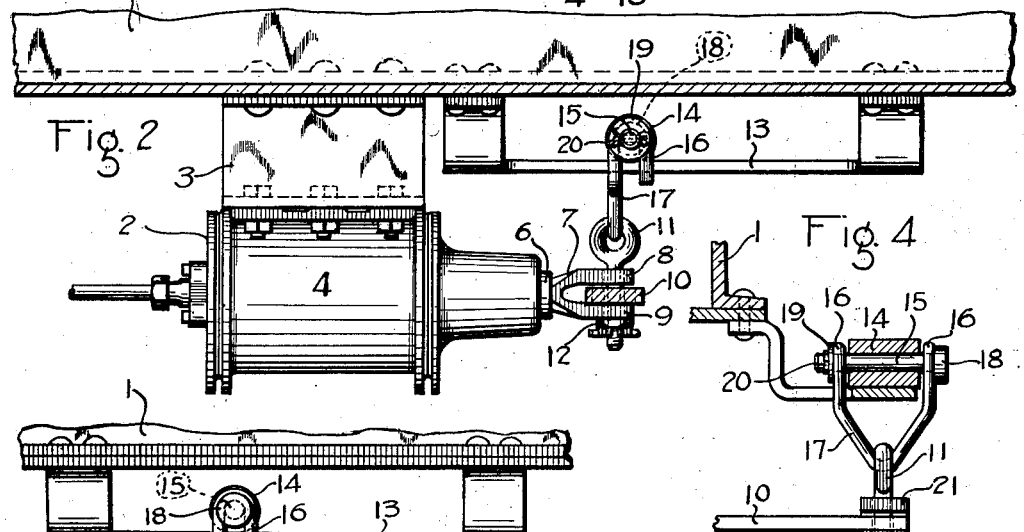
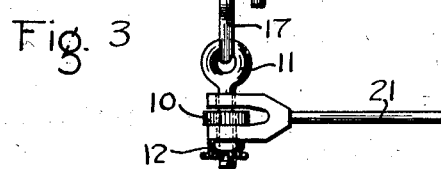
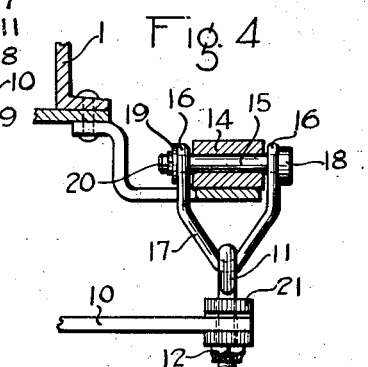
INVENTOR.
ALLEN E. OSTRANDER.
By *Wm. M. Cady*
ATTORNEY.

Patented Nov. 19, 1935

2,021,804

UNITED STATES PATENT OFFICE

2,021,804

BRAKE RIGGING SUPPORT

Allen E. Ostrander, New Rochelle, N. Y., assignor to The Westinghouse Air Brake Company, Wilmerding, Pa., a corporation of Pennsylvania Application January 28, 1932, Serial No. 589,391

7 Claims. (Cl. 188—205)

This invention relates to brake rigging for railway vehicles, and more particularly to the means for supporting that portion of the rigging associated with the body of the vehicle.

The principal object of my invention is to provide improved means for supporting a portion of a brake rigging from the body of a railway vehicle.

In railway vehicles it is the practice to slidably support the horizontally disposed brake cylinder lever and the other horizontally disposed brake levers upon supports secured to the underframe of the vehicle body, and to support the several brake rods and connections through the medium of the brake levers. The construction just described, besides offering frictional resistance to the movement of the several parts of the brake rigging, is more or less noisy in operation, especially if the lever supports have not been lubricated. The brake levers of this construction are not positively held in close engagement with their supports, so that when a car is in transit, these levers may be caused to vibrate into and out of engagement with their supports and consequently produce an undesirable chattering noise.

Further, in the construction above described, the bearing surface of the brake cylinder lever supports must be accurately positioned vertically, or else the weight of the brake cylinder lever will tend to cause the brake cylinder piston to cock in the brake cylinder. This positioning is difficult to accomplish since the vertical clearance in the connection between the end of the push rod and one end of the lever is slight. Another objectionable feature is that, due to the slight clearance between the push rod and the lever, only a slight wear of the wearing surface of the support would permit the weight of the brake lever to act on the push rod to cock the brake cylinder piston and, therefore, cause undue wear of the interior surface of the brake cylinder.

Another object of my invention is to provide improved means for supporting brake elements, such as brake levers and rods, which will be free from the above objectionable features.

According to my invention, a supporting member or bracket is secured to a fixed part of the vehicle body, and one or more brake elements are suspended from this support by a hanger having a roller which is adapted to roll on the support, said hanger having means for adjusting the position of the lever in a vertical direction.

A further object of my invention is to provide an adjustable support for the outer end of a brake cylinder push rod, which is adapted to prevent the weight of the brake cylinder lever, operatively connected thereto, from acting therethrough to cock the brake cylinder piston.

Other objects and advantages will appear in the following more detailed description of the invention.

In the accompanying drawing, Fig. 1 is a plan view of a portion of the underframe of a railway car, having a portion of a brake rigging supported therefrom in accordance with my invention, portions of the center sill being broken away; Fig. 2 is a longitudinal sectional view of the same taken on the line 2—2 of Fig. 1, illustrating the means for supporting one end of the brake cylinder push rod and the operatively connected end of the brake cylinder lever; Fig. 3 is a side elevational view illustrating the means for supporting the other end of the brake cylinder lever; and Fig. 4 is a fragmentary cross sectional view taken on the line 4—4 of Fig. 1.

As shown in the drawing, the reference character 1 indicates the center sill of a railway car, which may be of any desired construction, and 2 indicates a brake cylinder, which is mounted in the usual manner on a support 3 secured to the center sill.

The brake cylinder is of the usual construction comprising a cylinder portion 4, containing a piston 5, having a hollow stem 6, in which a push rod 7 is loosely mounted, the outer end of which rod is provided with spaced upper and lower jaw members 8 and 9, respectively.

Arranged below the center sill 1 is the usual live brake cylinder lever 10, which extends in a direction transversely of said sill and which is horizontally disposed.

One end of the brake cylinder lever is received in the space between the jaw members 8 and 9 of the push rod and is operatively connected with the jaw members by a vertically disposed eyebolt 11, the shank of said bolt passing through registering openings in the jaw members and the adjacent end of the lever 10. This bolt is secured in place by a nut 12, which has screw-threaded connection with the lower end portion of the shank and which engages the underside of the jaw member 9.

Secured to the center sill 1 and arranged above the push rod 7 of the brake cylinder, is a supporting track 13, upon which a roller 14 is free to roll. A pin 15 passes through this roller and projects a slight distance beyond each end of the roller. The projecting ends of the pin 15 are engaged by the hooked ends 16 of a yoke shaped hanger 17, which hanger, at its lower end, passes through and engages the eye portion of the bolt 11, thereby supporting the end of push rod 7 and through the medium of the rod 7 supports the adjacent end of the brake cylinder lever 10.

Unintentional movement of the pin 15 out of proper relation with the hanger 17 and the roller 14 is prevented by the head 18 on one end of the pin and the washer 19 and cotter pin 20 at the other end of the pin.

It will be noted that when the nut 12 is turned to its proper adjusted position, the outer end of the brake cylinder push rod 7 is supported in such a manner by the eye-bolt 11, hanger 17, pin 15, roller 14 and track 13 that the weight imposed upon the push rod by the brake cylinder lever 10 will not cause the push rod to act to cock the brake cylinder piston 5.

As shown in Fig. 3 of the drawing, the outer end of the brake cylinder lever 10 and one end of the usual pull rod 21, leading to the truck brake rigging, are operatively connected and supported from the center sill 1 by a mechanism which is identical with the supporting mechanism described.

One end of a pull rod 22 is pivotally connected to the brake cylinder lever 10 at a point intermediate the ends of the lever, the opposite end of the rod being connected to the usual dead lever (not shown).

The roller 14 is held against excessive movement transversely of the track 13 by the sides of the hanger 17, and the connection between the hanger 17 and the eye-bolt 11 is flexible so as to allow for the angular movement of the lever 10 when the brake rigging is operated.

While my improved supporting mechanism has been described in connection with the brake cylinder lever 10, it is to be understood that I contemplate its use in connection with any of the other brake levers and rods carried by the car body.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a brake rigging for a vehicle, the combination with a plurality of brake elements arranged in overlapping relation with each other, a member pivotally connecting said elements together, and means carried by the vehicle and attached to said member for supporting said elements.

2. In a brake rigging for a vehicle, the combination with a brake lever, of a brake element in overlapping relation with said brake lever, a member pivotally connecting said lever and element together, and means carried by the vehicle and attached to said member for supporting said lever and element.

3. In a brake rigging for a vehicle, the combination with a brake lever, of a brake element in overlapping relation with said brake lever, a member pivotally connecting said lever and element together, a support carried by the vehicle, a roller mounted on said support, and a hanger carried by said roller supporting said member and thereby said lever and element.

4. In a brake rigging for a vehicle, the combination with a brake cylinder, of a piston mounted in the brake cylinder, a push rod operable by said piston, a brake lever, and means supporting said push rod from a fixed part of said vehicle and pivotally connecting said push rod and lever together.

5. In a brake rigging for a vehicle, the combination with a brake cylinder, of a piston mounted in the brake cylinder, a push rod operable by said piston, a brake lever, and flexible means supporting said push rod from a fixed part of said vehicle and pivotally connecting said push rod and lever together.

6. In a brake rigging for a vehicle, the combination with a brake cylinder, of a piston mounted in the brake cylinder, a push rod operable by said piston, a brake lever, and bodily movable means supporting said push rod from a fixed part of said vehicle and pivotally connecting said push rod and lever together.

7. In a brake rigging for a vehicle, the combination with a brake cylinder, of a piston mounted in the brake cylinder, a push rod operable by said piston, a brake lever, a member pivotally connecting said push rod and lever together and having supporting engagement with said push rod, a supporting member carried by the vehicle, a roller mounted on the supporting member, and a supporting hanger in supporting engagement with the first mentioned member and carried by said roller.

ALLEN E. OSTRANDER.